June 15, 1954

G. D. CHAMPION 2,680,931

COASTER

Filed Feb. 2, 1951

INVENTOR.
GEORGE D. CHAMPION,
BY
Allen & Allen
ATTORNEYS.

Patented June 15, 1954

2,680,931

UNITED STATES PATENT OFFICE 2,680,931

COASTER

George D. Champion, Cincinnati, Ohio

Application February 2, 1951, Serial No. 209,095

10 Claims. (Cl. 45—68.4)

This invention relates to coasters such as are used under drinking glasses or the like to prevent the marking of finished table surfaces and the like. More particularly the invention relates to coasters of laminated construction which will almost instantaneously absorb drippings from a glass so that the surface of the coaster does not remain wet and which are so constructed that when the glass is elevated the coaster will not stick to the bottom of the glass.

When iced drinks are served in glasses or tumblers, particularly in humid weather, the moisture in the air condenses on the outside of the glass or tumbler and drips down onto the supporting surface. In a matter of a very few minutes the supporting surface will become wet, and it is well known that many finishes used on fine furniture will be marred by water.

It has therefore been customary to provide coasters upon which a drinking glass could be placed with the idea that the drippings would be caught by the coaster and would not mar the furniture. There have been many types of coasters available in the past, but all of them have had one or more objectionable features. The type of coaster which is of metal, wood, plastic or the like in the form of a shallow dish is objectionable in that the condensate from the external surface of the glass drips into the coaster and forms a pool therein so that the drinking glass actually rests in a pool of water. When the glass is lifted, drippings from the glass fall on the table and on the user's clothing.

Other types of coasters which are supposed to be absorbent in nature have the objectionable feature that when the glass is elevated the coaster will stick to the bottom of it, then later falling into the user's lap.

Non-porous coasters of various materials, particularly of metal, become chilled by contact with the cold beverage glass, and moisture from the air condenses on the coaster itself. The coaster thus is wetted not only by condensate from the glass but also by condensate on the surface of the coaster.

With the foregoing considerations in mind, it is an object of the present invention to provide a coaster which obviates the objectionable qualities discussed above. It is therefore an object of the invention to provide a coaster which will almost instantly absorb any moisture on its surface so that it will not give the appearance of being wet, even under relatively heavy condensation conditions. It is another object of the invention to provide a coaster which will not adhere to the glass so that the glass may be elevated while the coaster remains upon the table or other supporting surface. A still further object of the invention resides in the provision of a coaster which will be relatively inexpensive to manufacture and which will be pleasing in appearance and which can be used over and over again.

Yet another object of the invention involves the provision of a method of imparting a slight curvature to the finished coaster whereby the quality of non-adherence to the drinking vessel is achieved.

These and other objects of the invention which will be set forth in more detail hereinafter or which will be apparent to one skilled in the art upon reading these specifications, I accomplish by that certain construction and arrangement of parts of which I shall now describe an exemplary embodiment.

Reference is made to the accompanying drawing forming a part hereof and in which.

Figure 1:
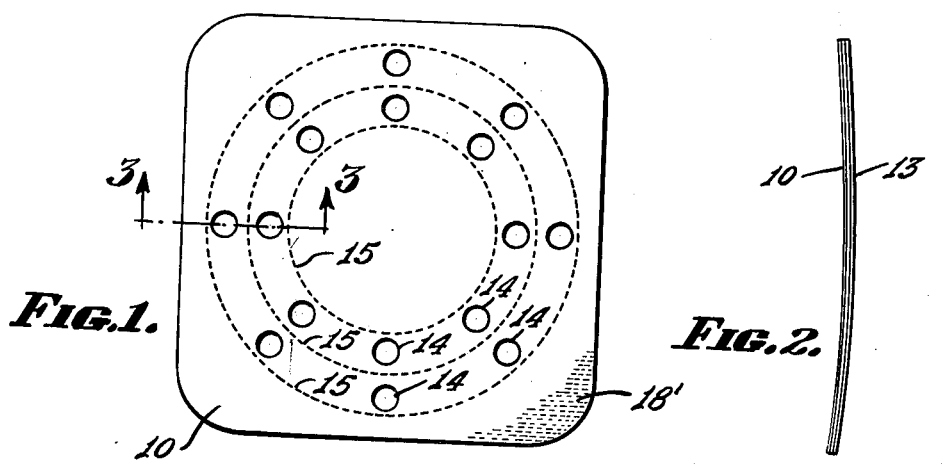
Figure 1 is a plan view of a coaster according to my invention.

Briefly, in the practice of my invention I provide a coaster of laminated construction. The upper surface of the coaster is of aluminum foil which is laminated by means of a water-proof adhesive to a layer of clay surface blotting paper, the clay surface of the blotting paper being laminated to the foil. The blotting paper face is laminated to two sheets of coverboard or the like, also by means of a water-proof adhesive. Holes are provided through the aluminum foil and the blotting paper, and minor perforations are provided through the aluminum foil to permit entry of moisture to the blotting paper. In its processing the coaster is given a slight curvature so that its configuration is of a portion of a cylinder so that when a glass is raised from the coaster the coaster tends to spring back to its curved form and will not adhere to the glass.

Referring now in more detail to the drawing, the coaster shown is square with rounded corners. It is to be understood that this is exemplary only and that the coaster may have any shape desired. In its external appearance it will have a slight curvature as clearly seen in Figure 2. It is constituted of a layer of aluminum foil 10, a layer of blotting paper 11 and two layers of coverboard 12 and 13. In external appearance on the upper surface of the coaster will be observed a series of holes 14 and a series of perforations 15 which may be disposed in circular form if desired.

The aluminum foil used is ordinary commercially available aluminum foil. The blotting paper which constitutes the lamina 11 is a standard blotting paper with a clay surface. It is sometimes referred to as "clay lined blotting paper" or "bonded blotting paper stock." Generally speaking, it is the type of blotting paper used for advertising purposes and carrying a printed message on its clay coated surface. The laminae 12 and 13 are preferably constituted of double-weight coverboard. I prefer to make the lamina 13 of a gray coverboard so that in appearance it matches the color of the aluminum foil, and I prefer to make the lamina 12 of some brightly colored coverboard such as red coverboard so that the color thereof will show through the holes 14 and give a decorative appearance to the coaster.

The adhesive to be used must be a water-proof adhesive and I prefer to use a water-proof latex resin type of glue.

Figure 4:
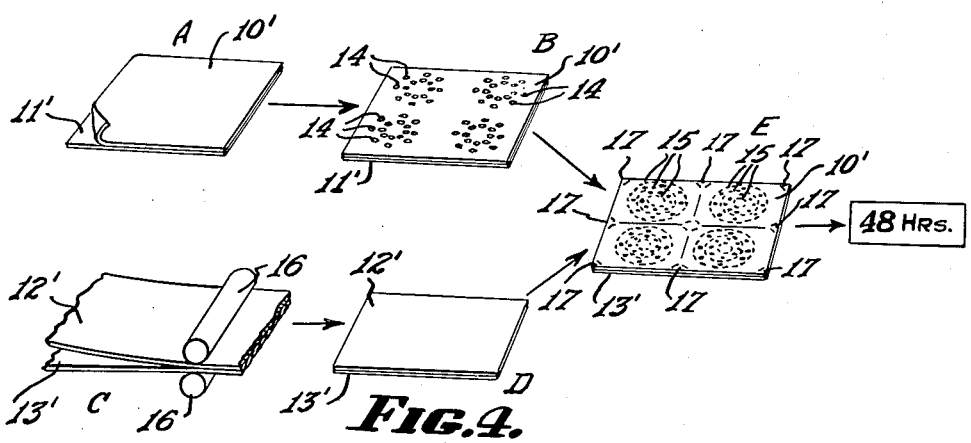
Figure 4 is a diagrammatic flow chart showing the procedure in the assembly of the coaster.

In the manufacture of my coasters I prefer to proceed as diagrammatically shown in Figure 4. At A I show a sheet of aluminum foil 10' laminated to a sheet of clay lined blotting paper 11'. It will be understood that the sheet shown will be large enough to constitute a plurality of coasters. In the particular diagram shown it is large enough for four coasters. At B I have shown the holes 14 punched in the laminated foil and blotting paper. It will be understood that the holes 14 may be arranged in any desired pattern for decorative effect.

At C I have shown the lamination of the two sheets of double-weight coverboard 12' and 13' which is accomplished in a conventional manner by coating the meeting surfaces with an adhesive and passing them through pressure rolls indicated diagrammatically at 16. A laminated set of coverboards is shown at D, cut to the same size as the sheets constituted of the laminae 10' and 11'. The partially prepared sheets at B and D are then laminated together and are punched to provide the indentations or perforations 15 and the outlines of the finished coasters as at 17. The outlines at 17 are not quite punched through, but they are punched through sufficiently that the coasters may later be separated by hand.

At this stage the sheet is still flat. It is complete except for the imparting of the curvature and the separation of the individual coasters. I prefer at this point to leave the sheet for a period of time on the order of forty-eight hours before proceeding with the next step. The desired effect can be produced in less time, say twenty-four hours, but I have found a period of about forty-eight hours to be preferable. I then pass the laminated complete sheet D over an embossing roll 18 and under a backing roll 19. The embossing roll 18 is provided with a surface to impart to the aluminum foil surface 10' the stippling effect indicated at 18' in Figure 1 in the lower right hand corner. The backing roll is of rubber or rubber-like material and is resilient so as to press the laminated sheet E tightly against the embossing roll 18 over a portion of the cylindrical surface of the roll 18.

Figure 2:
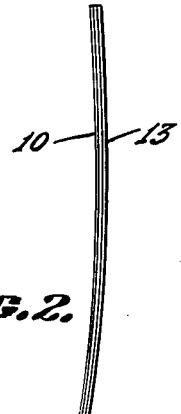
Figure 2 is a side elevational view of the same.
Figure 3:
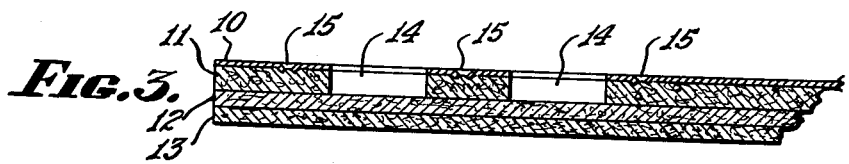
Figure 3 is a fragmentary cross sectional view greatly enlarged in scale, taken on the line 3—3 of Figure 1.
Figure 5:
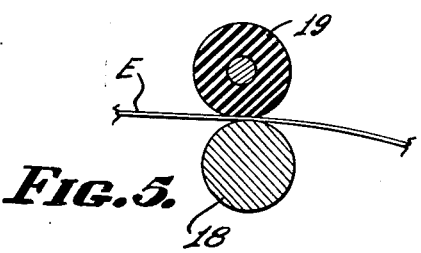
Figure 5 is a cross sectional view through an embossing roll and a backing roll in which the curvature is imparted to the coaster.

This embossing step imparts to the sheet E a permanent set in a slight curved condition, as clearly shown in Figures 2 and 5. While I do not wish to be bound by theory, it is my theory that the water proof latex resin glue used in laminating the various layers together is reactivated in the embossing step and a more thorough and permanent adhesive bond is achieved and this bond is achieved in a curved condition of the sheet by virtue of the maintenance of the sheet in contact with the embossing roll over a substantial portion of the surface of the latter.

After the sheet has passed through the embossing roll it is only necessary to separate the coasters from the shrouding manually which can be accomplished very easily on account of the punching step which was conducted at E.

In use any water rolling down the sides of the glass transfers itself readily to the aluminum foil surface because of the surface characteristics of the foil, and by capillary action it enters the holes 14 where it contacts the blotting paper and is immediately absorbed. Any moisture which does not enter the holes 14 will enter the small indentations and perforations 15 and will be absorbed in the blotting paper in the same way.

I have found that over a considerable period of time under extremely humid conditions with a drinking glass "sweating" profusely the upper surface of the coaster will not become wet, the coaster will not stick to the bottom of the glass and annoying dripping from the glass is eliminated.

Coasters according to the present invention may be used over and over again. After they have been used they may simply be put away and under normal conditions will dry out in a period of twenty-four hours to the point where they can be used again.

It will be understood that numerous modifications may be made without departing from the spirit of my invention and that I do not intend to limit myself in any manner other than as set forth in the claims which follow.

Having now fully described my invention, what I claim as new and desire to secure by Letters Patent is:

1. A laminated coaster having an upper layer of metal foil, an intermediate layer of blotting paper and a lower layer of coverboard, and water access openings in said metal foil to permit surface water to have access to said blotting paper layer, said coaster having a part cylindrical configuration.

2. A coaster comprising, in order from top to bottom, a lamina of metal foil, a lamina of blotting paper and at least one lamina of coverboard, and perforations in said foil lamina and in said blotting paper lamina, said laminae being adhesively secured to each other by means of a water-proof adhesive.

3. A coaster comprising, in order from top to bottom, a lamina of metal foil, a lamina of blotting paper and at least one lamina of coverboard, and perforations in said foil lamina and board, and perforations in said foil lamina and in said blotting paper lamina, said laminae being adhesively secured to each other by means of a water-proof adhesive, said coaster having a cylindrical curvature.

4. A coaster comprising, in order from top to bottom, a lamina of metal foil, a lamina of blotting paper and at least one lamina of coverboard, and perforations in said foil lamina and in said blotting paper lamina, said laminae being adhesively secured to each other by means of a water-proof adhesive, said coaster having a cylindrical curvature, said metal foil lamina being on the concave side.

5. A laminated coaster comprising a layer of clay lined blotting paper, a layer of metal foil laminated to the clay side of said blotting paper, at least one layer of coverboard laminated to the other side of said blotting paper, and water access openings in said metal foil to permit surface water to have access to said blotting paper, said coaster having a part cylindrical configuration.

6. A laminated coaster comprising a layer of clay lined blotting paper, a layer of metal foil laminated to the clay side of said blotting paper, at least one layer of coverboard laminated to the other side of said blotting paper, said metal foil and blotting paper layers having aligned holes therethrough to permit surface water to have access to said blotting paper, said coaster having a part cylindrical configuration.

7. A laminated coaster comprising a layer of clay lined blotting paper, a layer of metal foil laminated to the clay side of said blotting paper, at least one layer of coverboard laminated to the other side of said blotting paper, perforations extending through said metal foil layer and said clay lining to permit surface water to have access to said blotting paper, said coaster having a part cylindrical configuration.

8. A laminated coaster comprising a layer of clay lined blotting paper, a layer of metal foil laminated to the clay side of said blotting paper, at least one layer of coverboard laminated to the other side of said blotting paper, said metal foil and blotting paper layers having aligned holes therethrough, other perforations extending through said metal foil layer and said clay lining to permit surface water to have access to said blotting paper, said coaster having a part cylindrical configuration.

9. A laminated coaster comprising a layer of clay lined blotting paper, a layer of aluminum foil laminated to the clay side of said blotting paper, at least one layer of coverboard laminated to the other side of said blotting paper, said aluminum foil and blotting paper layers having aligned holes therethrough, other perforations extending through said aluminum foil layer and said clay lining to permit surface water to have access to said blotting paper, said coaster having a part cylindrical configuration.

10. A laminated coaster comprising a layer of clay lined blotting paper, a layer of aluminum foil laminated to the clay side of said blotting paper, at least one layer of coverboard of a contrasting color laminated to the other side of said blotting paper, said aluminum foil and blotting paper layers having aligned holes therethrough, other perforations extending through said aluminum foil layer and said clay lining to permit surface water to have access to said blotting paper and to exhibit the color of said coverboard layer therethrough, said coaster having a part cylindrical configuration.

References Cited in the file of this patent

UNITED STATES PATENTS

| Number | Name | Date |
| --- | --- | --- |
| 1,910,139 | Venable et al. | May 23, 1933 |
| 1,971,337 | Collins | Aug. 28, 1934 |
| 2,003,494 | Reynolds | June 4, 1935 |
| 2,004,166 | Low | June 11, 1935 |
| 2,014,268 | Tenney | Sept. 10, 1935 |
| 2,118,326 | Richardson | May 24, 1938 |
| 2,163,309 | McConnell | June 20, 1939 |
| 2,205,687 | Elsaesser | June 25, 1940 |
| 2,551,796 | Fitzpatrick | May 8, 1951 |